(12) United States Patent
Wang

(10) Patent No.: US 7,636,367 B1
(45) Date of Patent: Dec. 22, 2009

(54) METHOD AND APPARATUS FOR OVERBOOKING ON FIFO MEMORY

(75) Inventor: Sibing Wang, Shanghai (CN)

(73) Assignee: Integrated Device Technology, Inc., San Jose, CA (US)

( * ) Notice: Subject to any disclaimer, the term of this patent is extended or adjusted under 35 U.S.C. 154(b) by 547 days.

(21) Appl. No.: 11/421,330

(22) Filed: May 31, 2006

Related U.S. Application Data

(63) Continuation of application No. 11/250,873, filed on Oct. 14, 2005, now Pat. No. 7,573,896.

(51) Int. Cl.
*H04L 12/28* (2006.01)

(52) U.S. Cl. .................................... 370/412; 370/413

(58) Field of Classification Search .................... None
See application file for complete search history.

(56) References Cited

U.S. PATENT DOCUMENTS

| | | | |
|---|---|---|---|
| 6,876,668 B1* | 4/2005 | Chawla et al. | 370/468 |
| 6,975,638 B1* | 12/2005 | Chen et al. | 370/412 |
| 7,046,687 B1* | 5/2006 | Brown et al. | 370/412 |
| 7,093,037 B2* | 8/2006 | Duckman | 710/52 |
| 7,352,766 B2* | 4/2008 | Van Asten et al. | 370/429 |
| 2003/0112817 A1* | 6/2003 | Woo et al. | 370/413 |
| 2008/0225859 A1* | 9/2008 | Mitchem et al. | 370/395.21 |

* cited by examiner

*Primary Examiner*—Phirin Sam
(74) *Attorney, Agent, or Firm*—Heimlich Law, PC; Alan Heimlich, Esq.

(57) ABSTRACT

A method and apparatus for overbooking FIFO memory have been disclosed.

4 Claims, 5 Drawing Sheets

METHOD AND APPARATUS FOR OVERBOOKING ON FIFO MEMORY

RELATED APPLICATION

This patent application is a continuation of, and claims priority, of U.S. application Ser. No. 11/250,873 filed Oct. 14, 2005 titled "Method and Apparatus for generic interface, packet cut-through, overbooking, queue concatenation, and logical identification priority for a System Packet Interface device", which is hereby incorporated herein by reference, which claims priority of U.S. Provisional Application Ser. No. 60/619,234 filed Oct. 15, 2004 titled "Method and Apparatus for generic interface, packet cut-through, overbooking, queue concatenation, and logical identification priority for a System Packet Interface device", which is hereby incorporated herein by reference.

FIELD OF THE INVENTION

The present invention pertains to FIFO (First In First Out) type memory structures. More particularly, the present invention relates to a method and apparatus for overbooking of buffers from a shared FIFO memory.

BACKGROUND OF THE INVENTION

FIFO memories are often used in communications, data processing applications, computing, etc. and may be shared between multiple applications or data streams where data may be "bursty" in nature and temporary storage of this data is needed. Fixed sized FIFOs, statically allocated FIFO memory sizes, and/or evenly divided FIFO memory sizes may be too small in size to store enough data for an application or a data stream leading to loss of data. This may present a problem. If FIFOs are large enough to store enough data, they may be oversized which is wasteful of resources, power, etc. This may present a problem. For example, in communications large traffic burstiness may result in packet loss due to buffer overflow if buffer size is statically configured. This may present a problem.

BRIEF DESCRIPTION OF THE DRAWINGS

The invention is illustrated by way of example and not limitation in the figures of the accompanying drawings in which.

DETAILED DESCRIPTION

The present invention as embodied in one embodiment of a device may be used in a variety of flow control applications, for example, for packet processing. A packet-exchange device solves a myriad of interconnect problems in networking markets. For example, in one embodiment a FIFO may support 10 Gbps packet processing and offer a wide range of options for logical port density and buffering capabilities, ranging from low latency switching through complex flow-control designs.

In one embodiment of the invention, options and flexibility for demanding applications is provided. For example, high logical port counts or large data buffers needed to deal with the more complex data aggregation techniques used in many system architectures. This may assist in aiding NPUs (Network Processing Units) as processing elements by helping to regulate end-to-end traffic flow, where the system backpressure creates "bursty" data that can interfere with the correct operation of flow-control mechanisms.

In one embodiment of the invention, a backpressure scheme that tolerates a large range of logical port data rates is possible. In one embodiment the backpressure schemes are accomplished with the aid of large efficient buffers created from segmented memory. This allows faster response times and lower internal latency, while affording absorption of large external delays caused by data and flow control pipelines in adjacent devices such as packet-forwarding engines and PHY (Physical interface) devices. The buffering capabilities absorb typical bursts of in-flight packets and prevent loss of information that might occur as a result of long flow-control response times. This backpressure scheme also helps to reduce the frequency of congestion and starvation cycles at points in the data path, resulting in more efficient flow of packet data.

Figure 3:
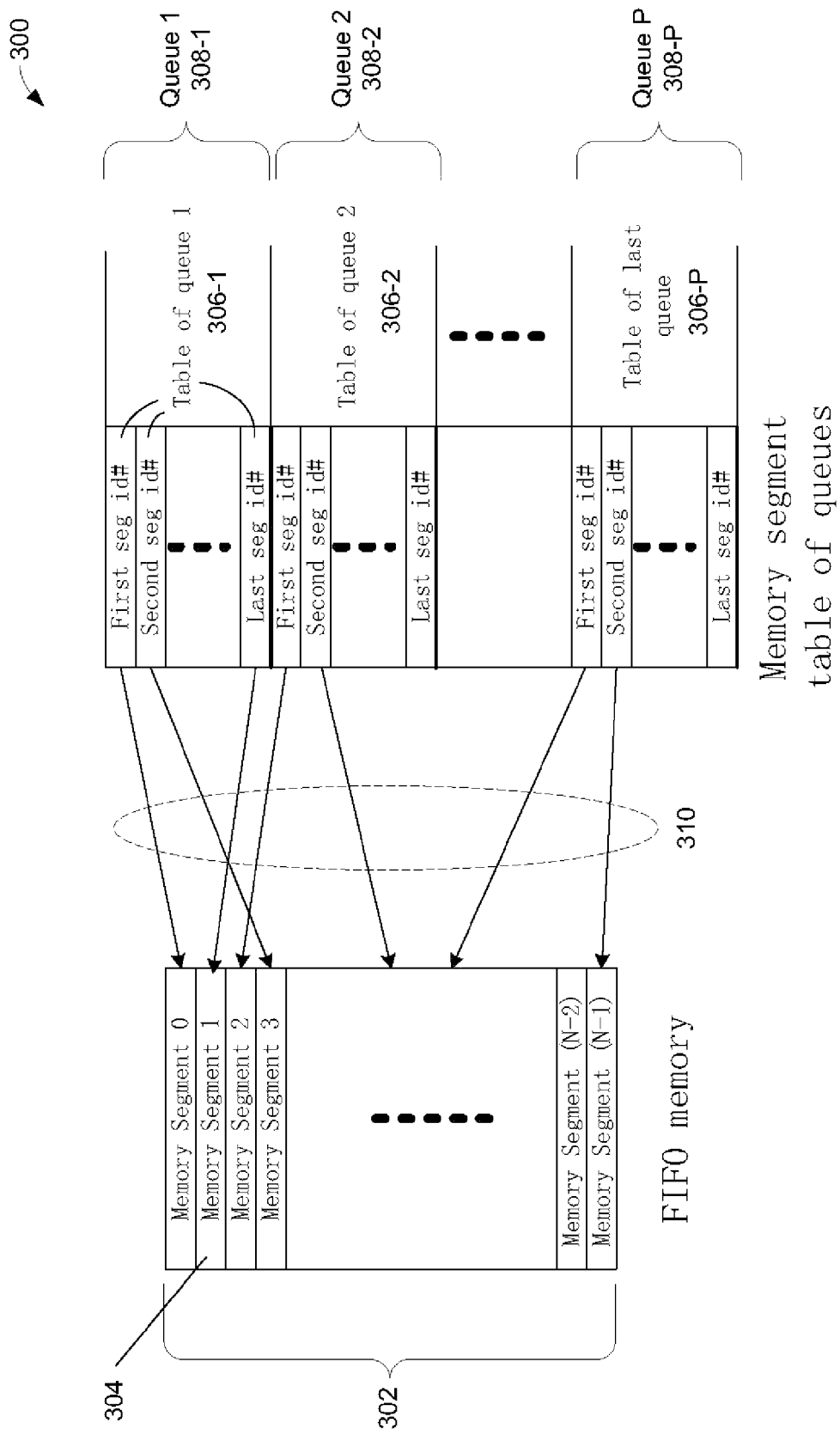
FIG. 3 illustrates one embodiment of the invention showing an architecture for overbooking FIFO memory.

FIG. 3 illustrates one embodiment of the invention, generally at 300, showing an architecture for overbooking FIFO memory 302. For example, the FIFO memory 302 is evenly divided into multiple small units, which are called memory segments (e.g. 304 illustrates memory segment with an ID of 1). Each memory segment, in this embodiment, has a fixed size (e.g. 256 bytes). Each memory segment is named with an ID, for example, from 0 to N−1, where N is the number of total memory segments (e.g. 512 segments). Each queue (308-1, 308-2, through 308-P) maintains a memory segment table (Table of queue 1 306-1, Table of queue 2 306-2, through Table of last queue 306-P respectively), which stores the IDs of the memory segments that contains the data of that queue (e.g. for Queue 1 308-1 is shown the Table of queue 1 306-1 showing entries for IDs stored in First seg_id#, Second seg_id#, through Last_seg_id#).

For sake of illustration, arrows, generally at 310, are used to denote the association between a queue segment ID and the FIFO memory segment. For example, Queue 1 308-1 Last seg_id# (in Table of queue 1 306-1) is currently associated with FIFO memory 302 Memory Segment 1 304.

The entries in the memory segment table of a queue are not fixed, that is, one or multiple IDs can be added to the table if the queue requires memory, and the last added on is the last ID. The first ID can be deleted from the table if the data contained in the memory-segment that was pointed to by the ID has been moved out, and the second ID then becomes effectively the first ID. This "ID recycle" mechanism facilitates the sharing of memory between queues.

One of skill in the art will appreciate that the total entry number of all the queues' memory segment tables is a multiple of the total memory segments. For example, it may be 8 times the number of memory segments (e.g. for 512 segments there are 4096 entries). These table entries may be evenly divided for Nq (e.g., 64) queues.

For example, assume a device has 64 queues (i.e. Nq is 64) and 512 total memory segments of 256 bytes each. In non-overbook mode, each queue would be limited to use only 512/64=8 entries of the segment table, thus a total of 8*256=2048 bytes of memory segments can be used by a queue. In overbook mode (e.g. 8× overbook), each queue can use 4096/64=64 entries, thus a total of 64*256=16384 bytes of memory segments can be used by a queue, which is 8 times larger than that of non-overbook mode.

One of skill in the art will appreciate that embodiments of the present invention may more effectively make use of FIFO memory to avoid overflow where some queues may have temporary heavy traffic bursts while other queues may be inactive during this period by allocating the memory to the busy queues.

Figure 4:
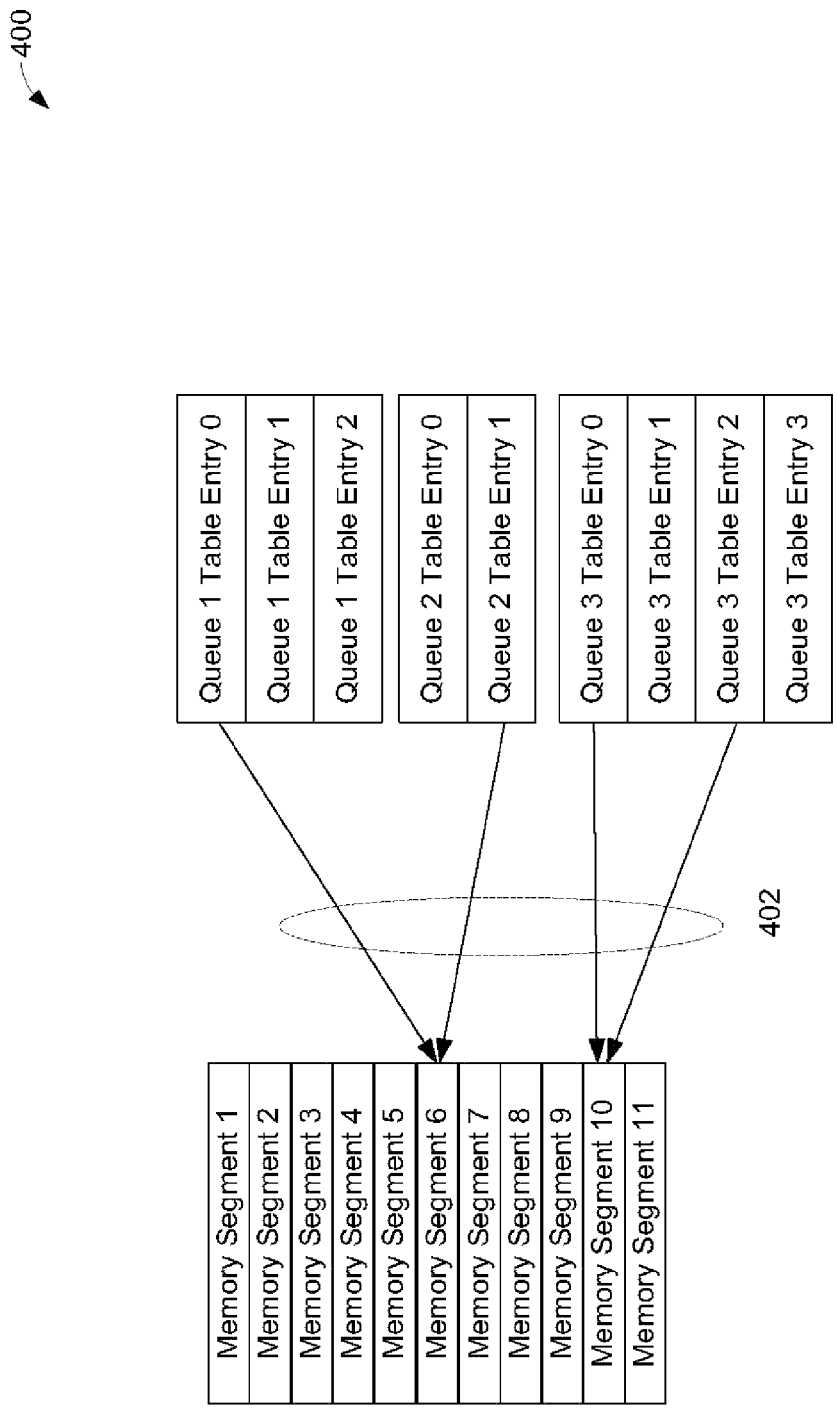
FIG. 4 illustrates one embodiment of the invention showing overbooking and associations.

FIG. 4 illustrates one embodiment of the invention, generally at 400, showing overbooking and associations 402. For example, more than one queue table entry (Queue 1 Table Entry 0 and Queue 2 Table Entry) may point to the same memory segment (Memory Segment 6). Additionally, more than a single table entry in a queue (Queue 3 Table Entry 0 and Queue 3 Table Entry 3) may also be associated with a same memory segment (Memory Segment 10). What is to be appreciated is that depending upon the requirements or design of a system the associations (402) may be dynamically adjusted as needed. For example if Queue 3 is experiencing heavy data traffic requiring more memory, then more memory segments may be allocated to Queue 3 (i.e. associated with Queue 3) whereas if Queue 1 is experiencing less traffic then fewer memory segments may be allocated to Queue 1.

Figure 5:
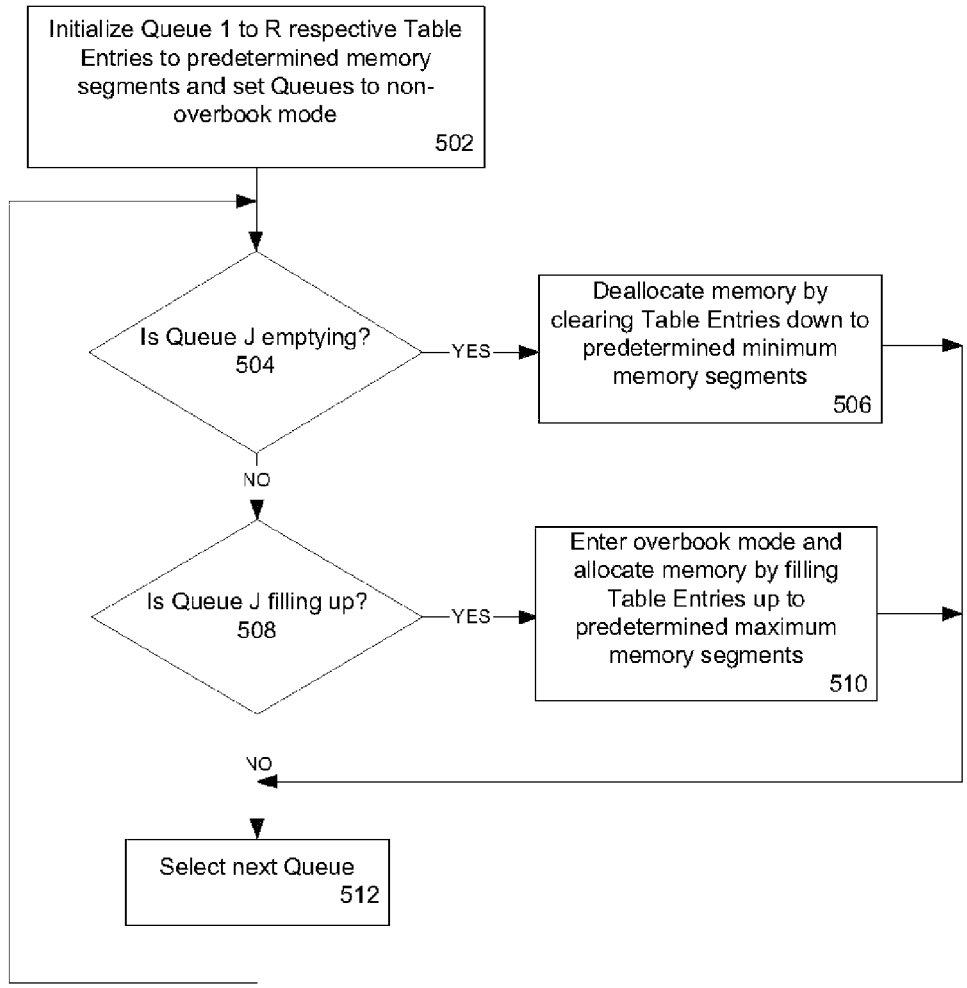
FIG. 5 illustrates one embodiment of the present invention in flow chart form.

FIG. 5 illustrates one embodiment, generally at 500, of the present invention in flow chart form. At 502 all queues (1 to R) have their respective table entries filled with predetermined memory segment(s) and the queues are set to non-overbook mode. As indicated above, non-overbook mode, sets aside for each queue a predetermined static amount of memory that is not accessible by other queues. At 504 a check is made to see if a particular queue being checked (J) (J denoting a queue in the range 1 to R inclusive) is emptying. If it is emptying then at 506 Queue J clears some amount of table entries down to a predetermined minimum. This frees up some memory that Queue J is not using. This clearing may be done a segment at a time or more than one segment may be cleared at a time. After one or more segments are cleared at 506 the next queue is selected 512 and the process repeats at 504. If Queue J (at 504) is not emptying then at 508 a check is made to see if a particular queue being checked (J) is filling up. If Queue J is not filling up then at 512 the next queue is selected and the process repeats at 504. If Queue J is filling up then at 510 Queue J enters overbook mode by allocating more memory by filling table entries with memory segments that are available. Available memory segments may be those that are not in use (such as previously released or deallocated), are noted for shared use (via for example a bit field), or are fixed for concurrent usage (predetermined). This filling of table entries may be done a segment at a time or more than one segment may be assigned or allocated at a time. Once the allocation is done at 510, the next queue is selected 512 and the process repeats at 504.

What is to be appreciated is that the allocation of memory in overbook mode is a dynamic process from the standpoint of memory allocation. Additionally, the degree of overbooking allowed may be static and/or dynamic. For example, a queue that experiences only a slight overflow based on a non-overbooked mode, may be configured to allow for a 2× overbooking only (static overbook mode). On the other hand, a queue handling a very bursty flow of data may have a 8× overbooking capability. This 8× capability may be invoked in 2×, 4×, and 8× increments as needed (dynamic overbook mode).

One of skill in the art will appreciate that the overbooking capability is not limited to 8× nor is it limited to powers of 2. For example, overbooking of 43% is possible by choosing and implementing the required table entries for a queue.

Thus a method and apparatus for overbooking on FIFO memory have been described.

Figure 1:
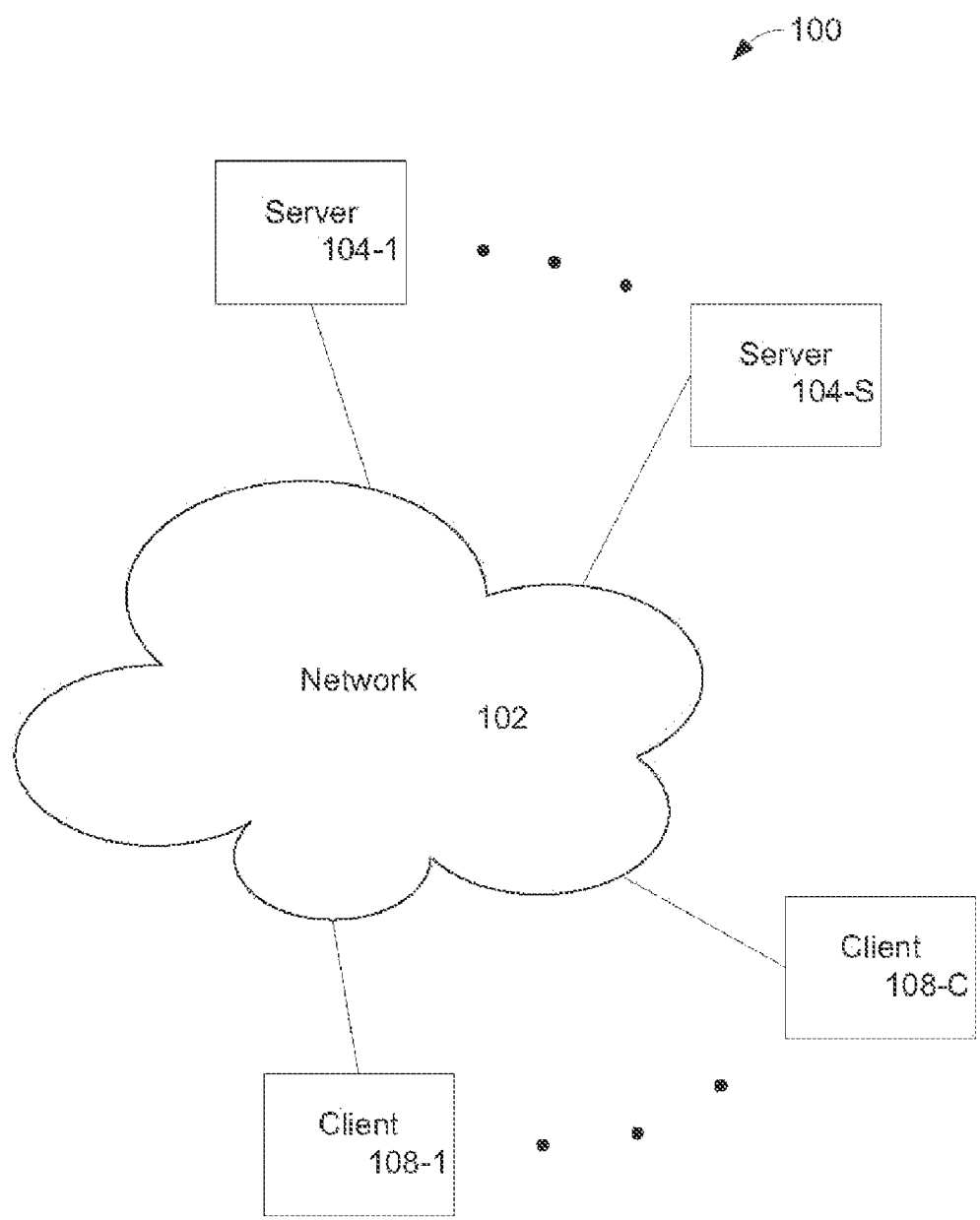
FIG. 1 illustrates a network environment in which embodiment(s) of the invention may be used.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
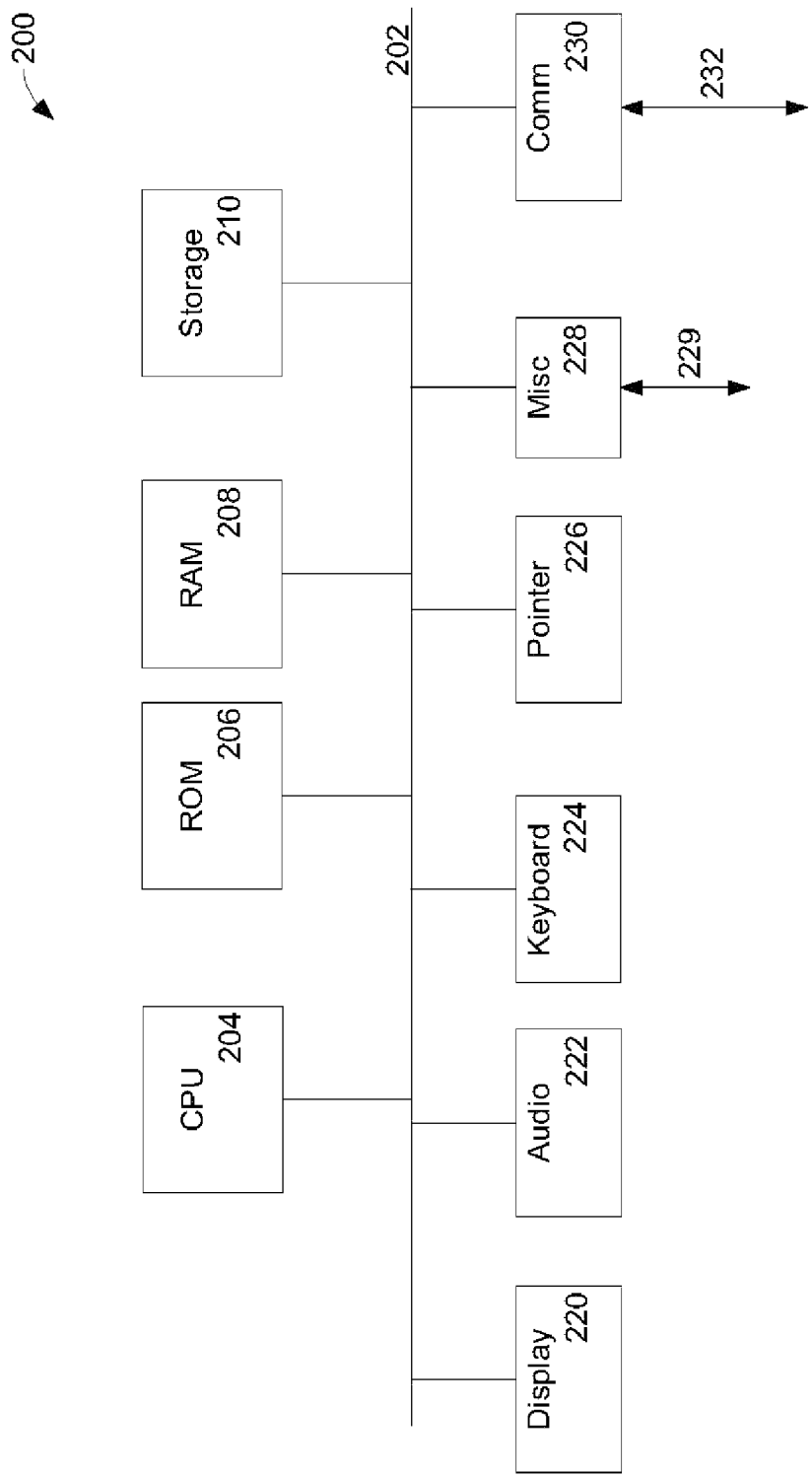
FIG. 2 is a block diagram of a computer system in which embodiment(s) of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, CPU, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. CPU 204 might use, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for overbooking FIFO memory have been described.

What is claimed is:

1. A method comprising:

initializing one or more queue table entries in a queue to one or more memory segments; and adjusting said one or more queue table entries in said queue based upon a state of said queue, wherein said state is selected from the group consisting of empty, near empty, half full, near full, and full, and wherein said adjusting is increasing a total of said one or more queue table entries denoted as T to a new value $T*2^K$ where K is an integer.

2. The method of claim 1 wherein said increasing is selected from the group consisting of allocating a memory segment, and marking a memory segment.

3. A method comprising:

initializing one or more queue table entries in a queue to one or more memory segments; and adjusting said one or more queue table entries in said queue based upon a state of said queue, wherein said state is selected from the group consisting of empty, near empty, half full, near full, and full, and wherein said adjusting is decreasing a total of said one or more queue table entries denoted as T to a new value $T*2^K$ where K is an integer.

4. The method of claim 3 wherein said decreasing is selected from the group consisting of deallocating a memory segment, and unmarking a memory segment.

* * * * *